United States Patent
Blass et al.

(10) Patent No.: US 7,493,544 B2
(45) Date of Patent: Feb. 17, 2009

(54) EXTENDING TEST SEQUENCES TO ACCEPTING STATES

(75) Inventors: Andreas Blass, Ann Arbor, MI (US);
Colin L. Campbell, Seattle, WA (US);
Lev Borisovich Nachmanson, Redmond, WA (US); Margus Veanes, Bellevue, WA (US); Michael Barnett, Seattle, WA (US); Nikolai Tillmann, Redmond, WA (US); Wolfgang Grieskamp, Redmond, WA (US); Wolfram Schulte, Bellevue, WA (US); Yuri Gurevich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 11/041,087

(22) Filed: Jan. 21, 2005

(65) Prior Publication Data
US 2006/0179383 A1    Aug. 10, 2006

(51) Int. Cl.
*G06F 11/00* (2006.01)

(52) U.S. Cl. .......................... 714/741; 714/742; 714/38; 717/100; 717/128; 717/124; 703/13; 703/23; 703/14; 703/15

(58) Field of Classification Search .................. None
See application file for complete search history.

(56) References Cited

U.S. PATENT DOCUMENTS

| 5,796,752 | A | * | 8/1998 | Sun et al. ..................... 714/738 |
| 7,088,864 | B2 | * | 8/2006 | Grieskamp et al. .......... 382/232 |
| 7,149,678 | B2 | | 12/2006 | Gurevich et al. |
| 7,315,973 | B1 | * | 1/2008 | Wise .......................... 714/741 |
| 2005/0050391 | A1 | | 3/2005 | Grieskamp et al. |
| 2005/0160404 | A1 | | 7/2005 | Nachmanson et al. |
| 2005/0198621 | A1 | | 9/2005 | Tillman et al. |
| 2006/0161404 | A1 | | 7/2006 | Campbell et al. |

OTHER PUBLICATIONS

Alur, et al., "Alternating Refinement Relations," in *Proceedings of the Ninth International Conference on Concurrency Theory (CONCUE'98)*, vol. 1466 of LNCS, 16 pages, 1998.

Alur, et al., "Distinguishing tests for nondeterministic and probabilistic machines," in *Proceedings of the 27th ACM Symposium on Theory of Computing*, 10 pages, 1995.

Artho, et al., "Experiments with Test Case Generation and Runtime Analysis," *Abstract State Machines 2003*, vol. 2589 of LNCS, 18 pages, 2003.

Barnett, et al., "The Spec# Programming System: An Overview," in M. Huisman, editor, *Cassis International Workshop*, LNCS, Springer, 21 pages, 2004.

(Continued)

*Primary Examiner*—John P Trimmings
(74) *Attorney, Agent, or Firm*—Klarquist Sparkman, LLP

(57) ABSTRACT

State spaces are traversed to produce test cases, or test coverage. Test coverage is a test suite of sequences. Accepting states are defined. Expected costs are assigned to the test graph states. Strategies are created providing transitions to states with lower expected costs. Linear programs and other approximations are discussed for providing expected costs. Strategies are more likely to provide access to an accepting state, based on expected costs. Strategies are used to append transitions to test segments such that the new test segment ends in an accepting state.

20 Claims, 6 Drawing Sheets

OTHER PUBLICATIONS

Barnett, et al., "Towards a Tool Environment for Model-Based Testing with AsmL," in *Formal Approaches to Software Testing*, FATES 2004, vol. 2931 of LNCS, pp. 252-266, Springer-Verlag, 2004.

Box, "Code Name Indigo: A Guide to Developing and Running Connected Systems with Indigo," *MSDN Magazine*, 12 pages, Jan. 2004.

Brinksma, et al., "Testing Transition Systems: An Annotated Bibliography," *Summer School MOVEP 2000: Modeling and Verification of Parallel Processes*, vol. 2067 of LNCS, 10 pages, Springer, 2001.

Campbell, et al., "Spec Explorer: An Integrated Environment for Model-Based Testing," *UW-MSR Summer Institute '04*, 13 pages, Aug. 2004.

Campbell, et al., "State Exploration with Multiple State Groupings," in D. Beauquier, E. Börger, and A. Slissenko, editors, *12th International Workshop on Abstract State Machines, ASM '05*, pp. 119-130, Mar. 2005.

Campbell, et al., "Testing Concurrent Object-Oriented Systems with Spec Explorer," in *Proceedings of the Formal Methods 2005*, vol. 3582 of LNCS, pp. 542-547, Spring-Verlag, 2005.

Chatterjee, et al., "Simple Stochastic Parity Games," in *CSL '03*, vol. 2803 of LNCS, Springer, 15 pages, 2003.

De Alfaro, "Computing Minimum and Maximum Reachability Times in Probabilistic Systems," in *Proceedings CONCUR 99*, J.C. M. Baeten and S. Mauw eds., vol. 1664 of Lecture Notes in Computer Science, Springer-Verlag, 17 pages, 1999.

De Alfaro, "Game Models for Open Systems," in *Proceedings of the International Symposium on Verification (Theory in Practice)*, vol. 2772 of Lect. Notes in Comp. Sci. Springer-Verlag, 26 pages, 2003.

Fujiwara, et al., "Testing nondeterministic state machines with fault-coverage," *Protocol Test Systems IV*, pp. 267-280, North Holland, 1992.

Glässer, et al., "Abstract Communication Model for Distributed Systems," *IEEE Transactions on Software Engineering*, vol. 30, No. 7, pp. 458-472, Jul. 2004.

Grieskamp, et al., "Generating Finite State Machines from Abstract State Machines," in *Proceedings of the International Symposium on Software Testing and Analysis (ISSTA)*, vol. 27, 19 pages, Jul. 2002.

Grieskamp, et al., "Instrumenting scenarios in a model-driven development environment," *Information and Software Technology*, vol. 46, No. 15, pp. 1027-1036, Dec. 2004.

Gurevich, "Evolving Algebras 1993: Lipari Guide," in *Specification and Validation Methods*, E. Börger, ed., Oxford University Press, 26 pages, 1995.

Gurevich, et al., "Semantic Essence of AsmL," Microsoft Technical Report, MSR-TR-2004-27, 55 pages, Jul. 2005.

Hartman, et al., "Model Driven Testing—AGEDIS Architecture Interfaces and Tools," in *1st European Conference on Model Driven Software Engineering*, 11 pages, Dec. 2003.

Kuliamin, et al., "UniTesK: Model Based Testing in Industrial Practice," in *1st European Conference on Model Driven Software Engineering*, 9 pages, Dec. 2003.

Nachmanson, et al., "Optimal Strategies for Testing Nondeterministic Systems," in *ISSTA'04 Software Engineering Notes*, vol. 29, 10 pages, ACM, Jul. 2004.

Puterman, *Markov Decision Processes: Discrete Stochastic Dynamic Programming*, Wiley-Interscience, New York, 2005.

Tretmans, et al., "TorX: Automated Model Based Testing," in *1st European Conference on Model Driven Software Engineering*, 13 pages, Dec. 2003.

Yi, et al., "Testing Probabilistic and Nondeterministic Processes," *Protocol Specification, Testing and Verification, XII*, pp. 47-61, North Holland, 1992.

Zhang, et al., "Optimal Transfer Trees and Distinguishing Trees for Testing Observable Nondeterministic Finite-State Machines," IEEE Transactions on Software Engineering, vol. 29, No. 1, 14 pages, Jan. 2003.

\* cited by examiner

FIG. 7

```
while( Q is not empty ){          ◄──── 708
    State w= Q.Dequeue();         ◄──── 704
    // create new empty test segment
    TestSegment segment=new TestSegment();   ◄──── 710
    //and add it to the test suite
    T.Add(segment);               ◄──── 702
    do{
        Transition transition=S(w);   ◄──── 706
        // attach the strategy transition to the sequence of segment transitions
        segment.Transition=segment.Transitions+[transition];   ◄──── 718
        w=transition.TargetState;    ◄──── 720
        if(w is accepting state)     ◄──── 712
            break;
        if(w belongs to NS){          ◄──── 714           ╱── 722
            segment.Choice={transition: transition.SourceState = w };
            foreach(Transition tr in segment.Choice){
                State u=tr.TargetState;
                if(u is terminal for T and u is not accepting)   ◄──── 724
                    Q.Enqueue(u);
            }
            break;
        }
    }
    while(true);                  ◄──── 716
}
```

//www.w3.org/TR/html40/loose.dtd">
EXTENDING TEST SEQUENCES TO ACCEPTING STATES

TECHNICAL FIELD

The technical field relates generally to providing testing for a device or software, and more specifically, to providing behavioral coverage with test sequences extended to accepting states.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The behavior and operation of devices may be described using abstract state machines (ASMs). For each action that the device may take, the ASM defines conditions that must be met to effect changes to the state of the device. The conditions may be said to "guard" changes to the device state, and may thus be referred to as guards on the device state. In a normalized form, state settings for each action that the device may take are guarded by simple (e.g., non-nested) conditions. For a more complete description of normalized ASMs, see Yuri Gurevich, *Evolving Algebra,* 1993: *Lipari Guide,* in Egon Boerger, *Specification and Validation Methods,* pages 9-36, Oxford University Press, 1995 (hereafter "*Evolving Algebra*"). ASMs have applications beyond describing the behavior and operation of devices. For example, ASMs may describe the behavior and operation of software programs executing on a general purpose computer system.

Each unique combination of state settings represents a state of the device in the ASM. For this reason, ASMs may have a large, even infinite number of states. Languages exists for specifying model programs (i.e., AsmL®, Spec#, etc.). These languages often include interpreters that will reduce the specific model into a finite state machine.

Well known techniques exist for generating test suites from finite state machines (FSMs). FSMs define the behavior of a device in terms of device states and the events that result in state changes. However, due to the very large or infinite number of states of the ASMs, it is often impractical to apply to ASMs the techniques for generating test suites from FSMs. A previous patent application provides a manner of producing an FSM from an ASM (see "Generating a Test Suite from an Abstract State Machine," U.S. patent application Ser. No. 10/071,524, filed Feb. 8, 2002, which is incorporated herein by reference and is hereafter referred to as "GTSASM"), which leads to the application of FSM test suite generation techniques to ASMs. This prior application provides a way of generating test suites from an ASM generated from a model program.

During test case generation from a model program, a finite transition system is produced that encodes interesting or relevant runs of the model program (a process called "FSM generation"), and then the finite transition system is traversed to produce test cases. The finite transition system produced from a model program can also be used to verify the behavior (e.g., inputs, outputs, etc.) of an implementation under test (e.g., device, software, etc.). Although a model program is expressed as a finite text, it typically induces a transition system (an "unwinding" of the model program) with a very large or even infinite state space.

FIG. 1 is a graphical representation of a test graph. As shown, the test graph provides three vertices 1, 2, and 3, and four edges a, b, c, d, and e. Behavioral coverage of this graph could be provided with a test suite comprising the following transition sequences,

[a]
[b, c]
[b, d, e].

Thus, a prior art method for generating test sequences, provides complete coverage of the test graph shown 100. However, other considerations arise in the context of non-deterministic testing or other reactive systems.

SUMMARY

The described technologies provide methods and systems for extending test sequences to accepting states. The following summary describes a few of the features described in the detailed description, but is not intended to summarize the technology.

In one example, a method receives a state space and an identification of an accepting state. In one example the state space is a FSM and the identification of a state space is a Boolean expression. In another example, the state space is a test graph comprising test sequences, and the accepting state comprises one or more test graph vertices. The method traverses the state space and assigns expected costs to vertices in the state space. In one such example, the expected costs are assigned to each vertex, and the cost assigned to each vertex represent the expected costs to access the accepting state through that vertex. In one such example, an expected costs vector $M[v]$ is generated by solving a linear program that maximizes the sum of the vector elements where vector $M[v]$ satisfies to a set of inequalities representing the costs to reach the accepting state from each state via adjacent states. In another example, expected costs are generated by an iterative approximation. In one example, the method traverses the expected costs and assigns strategies to vertices in the state space. In one such example, a strategy tells which edge to take to reach the accepting state with the lowest cost. In another example, the method traverses test segments in the test suite and locates test segments that terminate in non-accepting states. In such an example, the method appends transitions to these text segments, for example, to reach an accepting state.

In another example, system comprising an implementation and a testing tool is discussed. In one such example, a testing tool often receives a model program as input and generates a state space or finite state machine from the model program. Although not required, the test tool can create a test graph from the state space, FSM, or model program. However, one or more accepting states is indicated. The test tool explores the state space or test graph and finds one or more states that corresponds with an indicated accepting state.

In one example, the test tool utilizes linear programming methods or approximations thereof to solve linear inequalities relating to the costs to access the accepting state from the other states of the state space. The linear inequalities or equations (and or approximations) are used to find expected costs for each state. Strategies are created from the expected costs. The strategies are used to augment the test coverage. The test coverage is augmented by appending test segments to the test sequences, so that test sequences not only provide the desired coverage, but also end in accepting states. The strategies created using the linear equations (or approximations) are used to help determine the appended test segments. Optionally, the test tool then exercises an implementation under test (IUT) using the appended test segments, thereby ending each IUT test sequence in an accepting state.

Additional features and advantages will be made apparent from the following detailed description, which proceeds with reference to the accompanying drawings.

BRIEF DESCRIPTION OF THE DRAWINGS

FIG. 7 is a program listing of an exemplary method for extending a test suite.

DETAILED DESCRIPTION

Overview

Figure 1:
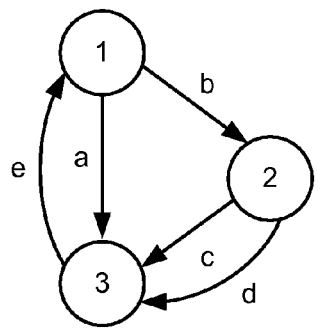
FIG. 1 is a graphical representation of a test graph illustrating test coverage.

In software testing in the context of test case generation from model programs, a finite transition system encodes interesting or relevant runs of the model program, a process called finite state machine (FSM) generation. Often, the FSM is traversed to produce test cases, or test coverage. The test coverage may also be provided in the form of a test graph. The described technology provides methods and systems that allow a test developer to indicate one or more states to end a test. This is valuable in many contexts, for example, when an instrument under test (IUT) has one or more states where completing a test sequence is better. For example, if an IUT has a system resource file open, it would be better to end a test in a state where the file can be closed, or after the file is closed. In another example, an IUT is involved in network communications, and it would be better to complete a test sequence after a network connection is closed. Often, it is a matter of cleaning up resources before beginning another test. In another example, the described technology generates test cases using accepting states so the test case generator can reset the IUT. For example, so that method calls for resetting, cleanups, resource destructions, and file closing can be called.

In one example, a test developer defines one or more accepting states. A test tool receives the accepting states and appends test segments to the coverage. In one example, a test coverage is a test suite of sequences. This allows the freedom to define test suites of the FSM that are terminal.

In another example, once an accepting state is defined, strategies are generated that provide one or more transitions to an accepting state. In one such example, states of the graph are assigned expected costs. The expected costs assigned to a state represent costs to reach an accepting state from that state. When an IUT is in a state that has transitions to several adjacent states, a strategy indicates which transition to take. A transition to a state with lower expected costs is more likely to provide access to an accepting state. Expected costs can represent, for example, the expected time to reach an accepting state, execution of transitions to reach an accepting state, number of transitions to reach an accepting state, or the computing resources used to reach an accepting state.

After coverage is complete, a strategy is used to direct test graph or FSM traversal to an accepting state. In one example, strategies are used to append transitions to test segments such that the new test segment ends in an accepting state. In another example, strategies are used to direct a shortest path through a graph. In one such example, a linear program is developed for providing expected costs.

In another example, an FSM and an accepting state is provided to a tool, and the described methods and systems provide a lowest (or efficient) expected cost (e.g., strategy) through the FSM to the accepting state. Thus, the described technology is not limited to adding one or more transitions to test segments to end in an accepting state.

For example, if the test graph of FIG. 1 is provided as input along with a single accepting state 102, the following test suite would provide exemplary test coverage of the transitions of the input graph and each of the three test sequences would leave the IUT in the desired accepting state,

[a, e]
[b, c, e]
[b, d, e].

Exemplary Accepting States

A user of the described technology is able to indicate or identify one or more accepting states in a test graph or FSM.

In one example, an expression is defined based on one or more properties (e.g., state variables). A test tool uses the expression to identify accepting states in a state space. In one such example, an expression ("Accepting( )") provides a Boolean result based on variable-value assignments in a state space. The Boolean expression returns true for accepting states.

```
bool Accepting( )    {
    if ((Connection == closed) and (users == 0))
    then return true;
    else
    return false;
}
```

Thus, a testing tool explores a state space such as an FSM or test graph, and identifies accepting states as states where the Boolean expression is true.

In another example, a test developer encounters a problem during running a test suite and determines it would be desirable to end test sequences under certain conditions. The test developer could identify a desirable node (or nodes) in a graphical representation of a test graph. Regardless of the method used to identify accepting states, the described method and systems would develop expected costs and a corresponding strategy required to end a next test in the identified desirable node (or nodes).

The examples provided throughout this specification are meant to provide context and should not be used to limit the scope of or implementation of the described methods and systems. Various other scenarios will become apparent where it would be valuable to exercise software or a device through a state space such that it executes a series of transitions that end in an expressed or identified state.

Exemplary Method for Extending Test Sequences to Accepting States

Figure 2:
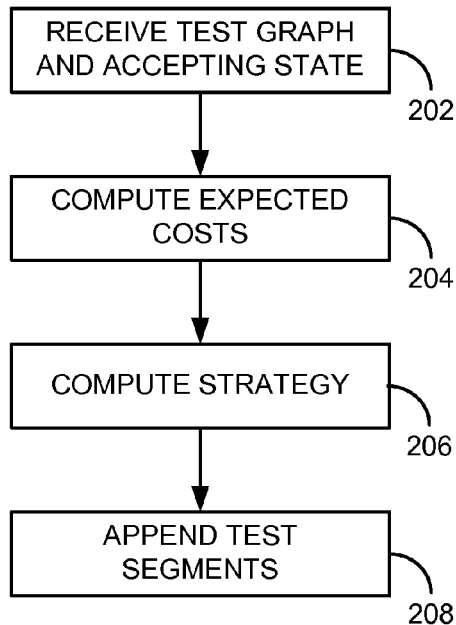
FIG. 2 is a flow chart of an exemplary method for extending test sequences to accepting states.

FIG. 2 is a flow chart of an exemplary method for extending test sequences to accepting states.

At 202, the method receives a state space and an identification of an accepting state. In one example the state space is a FSM and the identification of the accepting state is a Boolean expression. In another example, the state space is a test graph comprising test sequences, and the accepting state comprises one or more test graph vertices.

At 204, the method traverses the state space and assigns expected costs to vertices in the state space. In one such example, the expected costs are assigned to each vertex, and the cost assigned to each vertex represent the expected costs to access the accepting state through that vertex.

In one such example, the states of the state space are labeled $0, 1, \ldots, n-1$, with the accepting state being labeled 0. A vector $M[v]$ is used to store the expected cost to reach the accepting state from each state v. In one such example, $M[v]$ is generated by solving a linear program that maximizes the sum of the $M[v]$ vector elements where vector $M[v]$ satisfies to (a) a set of inequalities representing the costs to reach the accepting state from each state via adjacent states, and (b) $M[v] \geq 0$ for all v. This example is described formally later as "LP". In another example, expected costs are generated by approximation. One such example is discussed later in the context of EQ10 and EQ11.

At 206, the method traverses the expected costs and assigns strategies to vertices in the state space. In one such example, a vertex has two edges exiting the vertex. A strategy tells which edge to take to increase the likelihood of reaching reach the accepting state with a lower cost. In one example, a strategy is represented as $u=S(v)$. In this example, the method calls the Strategy function upon arrival at the v vertex (i.e., $S(v)$), and the function returns the vertex u to go to next.

At 208, the method traverses the test segments in the test suite and locates test segments that do not end in an accepting state. The method then appends transitions to these test segments until the test segments arrive in accepting states.

Exemplary System for Generating Strategies from Test Graphs

Figure 3:
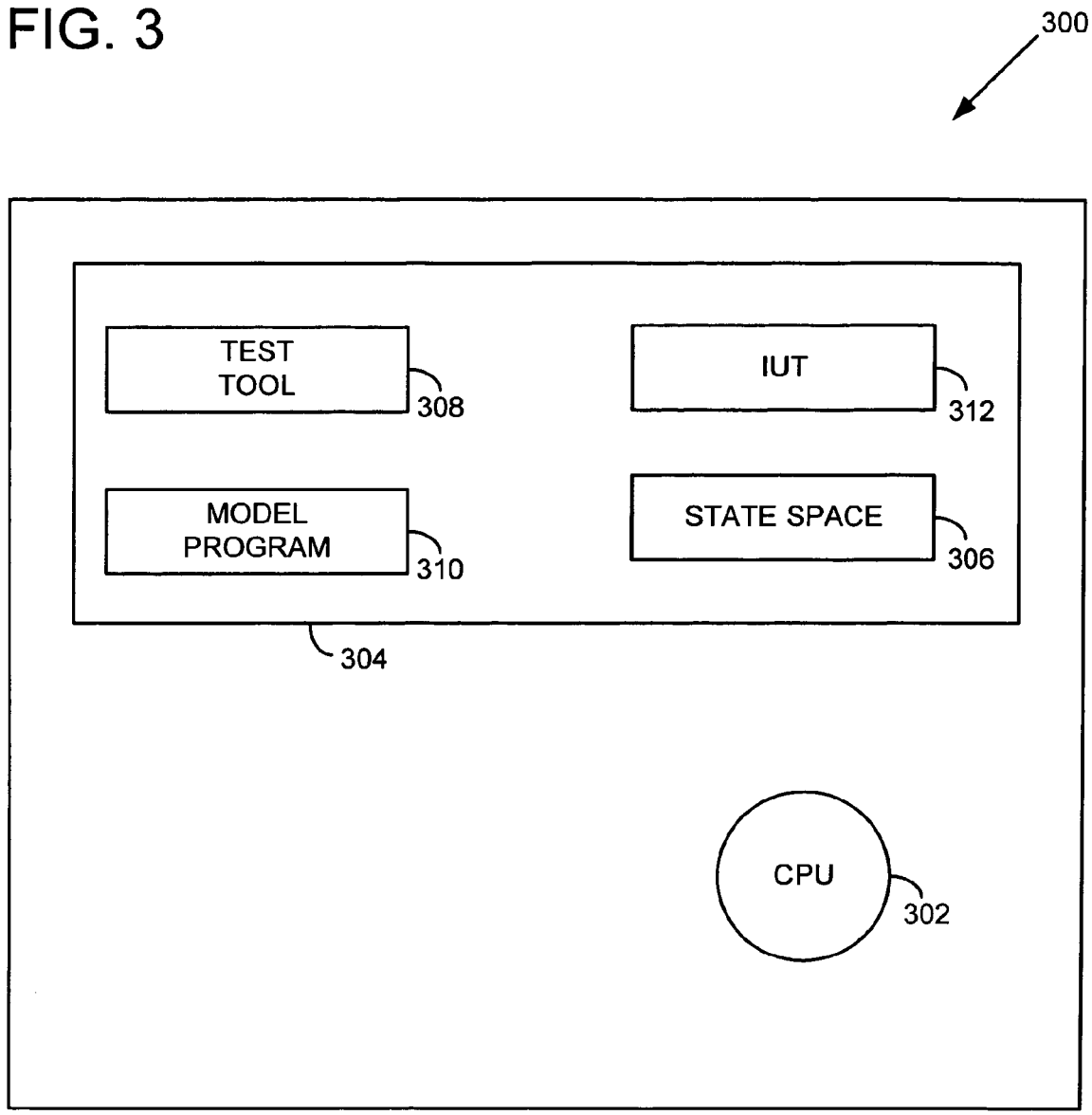
FIG. 3 is a block diagram of an exemplary system for generating strategies to an accepting state.

FIG. 3 is a block diagram of an exemplary system for generating strategies to accepting states. The computer system 300 includes one or more processors 302 and a memory 304. The processor(s) execute programs which include instructions, data, and/or state. One or more programs execute modules 306-310, that create input or other testing conditions for testing other programs 312. A module is a function, method, component, thread, or process that performs a described service. Modules can be grouped or separated so long as they are available to perform a desired service.

A testing tool 308 comprises plural modules for testing an implementation under test IUT 312. Although not required, a testing tool often receives a model program 310 as input and generates a state space or finite state machine 306 from the model program. Although not required, the test tool can create a test graph from the state space, FSM, or model program. However, one or more accepting states must be indicated and optionally, can be represented as an expression. The test tool explores the state space or test graph and finds one or more states that corresponds to an indicated accepting state.

The test tool utilizes linear programming methods or approximations to solve linear inequalities relating the costs to access the accepting state from the other states of the state space. The linear inequalities or equations (and or approximations) are used to find expected costs. Strategies are created from the expected costs. The strategies are used to augment the test coverage. The test coverage is augmented by appending test segments to the test sequences, so that test sequences not only provide the desired coverage, but also end in accepting states. The strategies created using the linear equations (or approximations) are used to help determine the appended test segments. The test tool then exercises the IUT using the appended test segments, thereby ending each IUT test sequence in an accepting state.

Exemplary Strategies from Test Graphs

Model based test generation for reactive systems reduces in some cases to generation of a strategy for a reachability game played on a test graph. The test graph is a finite approximation of the model. An important subclass of test graphs called transient test graphs is considered, where the distinguished goal vertex of the graph can be reached from all vertices in the graph. Transience arises from a practical requirement that tests end in a distinguished goal vertex (i.e., an accepting state). A strategy that minimizes the expected costs of reaching the goal vertex can be created by solving a linear program if the graph is transient. A few exemplary methods are described that find strategies by solving linear equations or by an approximation.

In industrial software testing it is often infeasible to specify the behavior of a large reactive system as an explicit finite transition system. To avoid explicit representation of transitions required in other test generation techniques, system behavior is generated via a model program, where some methods are marked as actions. Invocations of actions represent the system transitions. This approach is taken by the SpecExplorer® tool developed in the Foundations of Software Engineering group at Microsoft Research, where the model program is written in a high level specification language AsmL® (see e.g., Gurevich, Y. et al., Semantic Essence of AsmL®, Microsoft Research, Technical Report MSR-TR-2004-27; Barnett, M. et al., The Spec# Programming System: An Overview, Microsoft Research 2004).

In order to distinguish behavior that a tester has full control over, from behavior that is observed such the behavior of an IUT, the actions of a model program are partitioned into controllable and observable actions. Thus, the model provides for both deterministic and non-deterministic behavior. See, Non-Deterministic Testing, U.S. patent application Ser. No. 10/758,797, filed Jan. 15, 2004, which is incorporated herein by reference. The model corresponding to a model program P is a transition system that provides an unwinding or expansion of P; the model is often infinite because of unbounded data structures and objects used in P. Semantically, a model may be considered to coincide with interface automata as a game model of reactive systems. See L. de Alfaro, Game Models for Open Systems, Proceedings of the International Symposium on Verification (Theory in Practice), Lecture Notes in Computer Science 2772, Springer-Verlag, 2003 (hereafter "Game Models").

One of the tasks of SpecExplorer®& is to generate test cases from models programs written in languages such as AsmL® and Spec#®, both from Microsoft Corporation. Typical users of SpecExplorer® deal daily with models of reactive systems. For example, upcoming computer systems provide a unified programming model and communications infrastructure for distributed applications. See Box, D. *Code Name Indigo: A Guide to Developing and Running Connected Systems with Indigo,* MSDN Magazine, January 2004. In one example, test cases are generated using game strategies that are played according to the rules of the model. For example, some transitions can be labeled as controllable actions or moves of a test tool (TT) and other transitions are labeled by observable actions or moves made by an IUT. For large or even infinite models, the first phase of the test case generation task is to generate a finite approximation of the model (FSM generation). See Generating a Test Suite From an Abstract State Machine, U.S. patent application Ser. No. 10/071,524, filed Feb. 8, 2002, which is incorporated herein by reference. If desirable, during FSM generation various restrictions on possible model states are introduced to limit the size of the state space to a feasible range. In one example, an output of the FSM generation phase is a finite approximation of the model, called a test graph. Test graphs can be used to provide behavioral coverage of the test graph, but in practice the provided test sequences leave the implementation under test in an undesirable state. For example, a test sequence generated from a test graph would leave the implementation under test in a state such that system resources remain open for the implementation under test.

Instead, a tester provides one or more states, called accepting states. Linear equations (and or approximations) are used to create strategies that are used to augment the test coverage. The test coverage is augmented by appending test segments to the test sequences, so that test sequences not only provide the desired coverage, but also end in accepting states. The strategies created using the linear equations (or approximations) are used to help determine the appended test segments.

Several algorithms are described that generate optimal length-bounded strategies from test graphs, where optimality is measured by minimizing the total cost while maximizing the probability of reaching the goal, if the goal is reachable. See, Non-Deterministic Testing, U.S. patent application Ser. No. 10/758,797, filed Jan. 15, 2004, and see Nachmanson, L. et al, Optimal Strategies For Testing Nondeterministic Systems, ISSTA'04, volume 29 of Software Engineering Notes, pages 55-64, ACM, Jul. 2004 (hereafter "Optimal Strategies"). The problem of generating a strategy with optimal expected cost is stated as an open problem in Optimal Strategies. In one example, the strategies are shown herein to be optimal for test graphs if the goal is reachable from every vertex. In such an example, test graphs of this sort are called transient.

Transience is a natural requirement for test graphs when used as a basis for test case generation for reactive systems. Often an IUT does not have a reliable reset that can bring it to its initial state, and thus re-execution of tests is possible from certain states from which a reset is allowed. A typical example is when IUT is a multithreaded API. As a result of a move of TT (a controllable action) that starts a thread in the IUT, the thread may acquire shared resources that are later freed. The test should not be finished before the resources have been freed. FSM generation does not always produce transient test graphs, because of premature termination of state space exploration. However, there are efficient algorithms that can be used to prune the test graph to make it transient. See Chatterjee, K. et al., Simple Stochastic Parity Games, CSL 03: Computer Science Logic, Lecture Notes in Computer Science 2803, pages 100-113, Springer-Verlag, 2003 (hereafter "Parity Games"), and de Alfaro, L. Computing Minimum and Maximum Reachability Times in Probabilistic Systems, International Conference on Concurrency Theory, volume 1664 of LNCS, pages 66-81, Springer, 1999 (hereafter "Probabilistic Systems").

In this example, strategies are created for a transient test graph. In one example, an optimization is provided via linear programming. In another example, an approximation provides strategies for a transient test graph.

Figure 4:
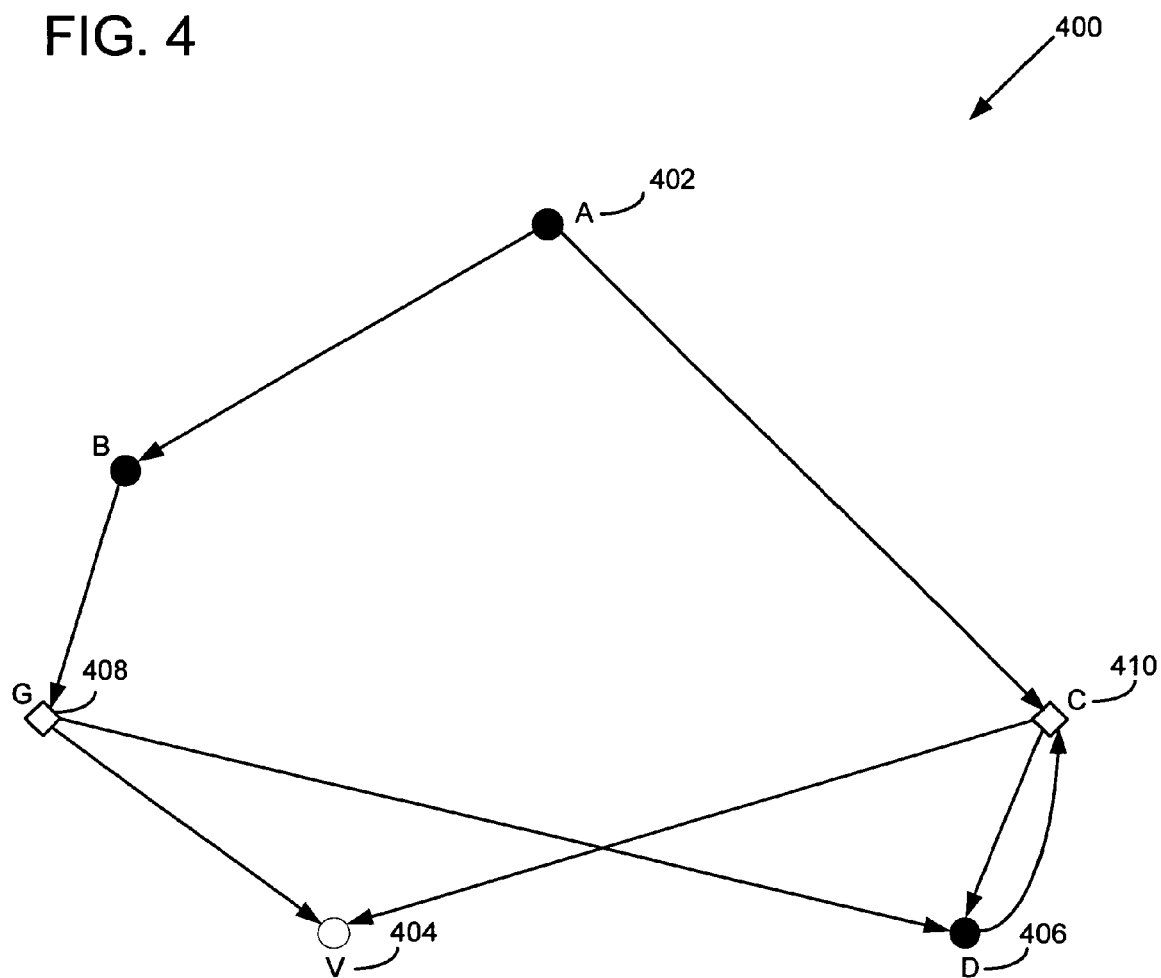
FIG. 4 is a graphical representation of a non-deterministic test graph with a goal state.

FIG. 4 is a graphical representation of an exemplary test graph 400. A test graph G has a set V of vertices and a set E of directed edges. The set of vertices V consists of states (States), choice points (Choices), and a goal vertex (g). In the example 400, States are represented as points ● 402, Choices are represented as diamonds ◇ 408, and a goal(s) is represented as an empty point ○ 404. States, Choices and {g} are mutually disjoint sets. In another example, a test graph has plural goal vertices. In one example, no edges exit from the goal vertex 404. There is a probability function p mapping edges exiting from choice points to positive real numbers such that, for every choice point u 408, 410, the following holds true, $$\sum_{(u,v)\in E} p(u, v) = 1 \qquad (EQ1)$$

Simply stated, for each choice point u, to another vertex v, there is a probability that the (u, v) edge will be selected by the IUT. And the sum of all probabilities of all edges exiting a choice point u is equal to 100%. Thus, although which edge is selected by the IUT is unknown, the sum of the probabilities of the various edges exiting a choice point equals is known. A tester can assign probabilities to edges exiting choice points. Probabilities can also be evenly distributed across all edges exiting a Choice. Probabilities can also reflect measurement of IUT behavior. Notice that this implies that for every Choice there is at least one edge starting from it, and the same can be said for States. Finally, there is a cost function c(u, v) for edges exiting Choices and States. The cost function "c( )" maps edges to positive real numbers. One can think about the cost of an edge as, for example, the time to execute the corresponding function call in the IUT. Resources other than time may also be considered in a cost function.

Formally, the test graph G can be defined as a tuple {V={States, Choices, g} E, p, c). In one example, for every u, v ∈ V, there is at most one edge with u as a source and v as a target. Thus every edge is given by its two endpoint vertices and it may be assumed without loss of generality that E ⊂ V×V. It is also convenient to assume that the cost function is defined on all elements on V×V by letting c(i, j)=0 for every (i, j) ∉ E. Later a method is discussed for transforming a graph to avoid multiple edges between two vertices.

Given a test graph G, a reachability game over G is given by a start vertex S ∈ V. The reachability game is denoted by R(s). There are two players in the game, a TT and an IUT. The current state of the game is given by a marked vertex v. Initially v=s. During the game, if v is a State then TT chooses an edge exiting v and the target node of the edge becomes the new v. However, if v is a choice, then IUT randomly picks an edge exiting v according to the probability distribution given by p and moves the marker from v to the end of the edge. TT wins R(s) if the marker reaches g. With every move "e" the testing tool TT pays a cost c(e) and the total amount spent by TT is the game cost. The cost remains undefined if the g is never reached.

A strategy for a test graph G is a function S from States to V such that (u, S(u)) ∈ E for every u ∈ States. For example, a strategy tells TT which edge to take when the game has arrived at a State v. Remember, at choice points, moves of an IUT are observed. So, a strategy S is used by TT to choose an edge (v, S(v)) when the marker stands on v. A reachability game R(v, S) is defined as a game R(v) where TT follows the strategy S. It would be helpful to measure reachability game strategies and compare them. For this purpose, for every strategy S, a vector $M_S$ is defined with coordinates indexed by V such that for each $v \in V$, the value $M_S[v]$ is the expected cost of the game R(v, S). If the expected cost is undefined then $M_S[v]$ equals $\infty$. $M_S$ is said to be defined if $M_S[v]$ is defined for all v. If, for example, "c" reflects the durations of transition executions, then Ms reflects the expected game duration.

A strategy S is optimal if $M_S[v] \leq M_{S'}[v]$ for every strategy S' and for every $v \in V$ or more concisely, if $M_S \leq M_{S'}$.

Imagine that the vector M of the smallest expected costs is known and all elements of M are finite. Then an optimal strategy can be immediately constructed by choosing S(u)=v such that $$c(u, v) + M[v] = \min_{(u,w) \in E} \{c(u, w) + M[w]\}$$

Therefore, after an optimal vector M is determined, it is used to calculate an optimal strategy. Vector M is calculated by using either a linear programming method (e.g., LP below) or by an approximation algorithm (e.g., EQ10 and WQ11 below).

First, some concepts are discussed about how expected costs and resulting strategies are developed. Suppose that vertices V of an input test graph G are enumerated (e.g., indexed or named) vertex 1, vertex 2, ..., and vertex n-1, and the goal vertex g is vertex 0. Next, consider a fixed test graph G and a strategy S over G. Let us consider a n×n matrix $P_S$ where $P_S[i, j]$ is defined as follows:

$$P_S[i, j] = \begin{cases} p(i, j), & \text{if } i \text{ is a choice point and } (i, j) \in E \\ 0, & \text{if } i \text{ is a choice point and } (i, j) \notin E \\ 1, & \text{if } i \text{ is a state and } j = S(i) \\ 0, & \text{if } i \text{ is a state and } j \neq S(i) \\ 1, & \text{if } i = 0, j = 0 \\ 0, & \text{if } i = 0, j \neq 0. \end{cases} \quad (EQ2)$$

Thus, $P_S[i,j]$ is the probability that the game R(i, S) makes the move (i, j) from vertex i to vertex j. So $P_S$ is a probability matrix, also known as stochastic matrix, because all entries are non-negative and each row sums to 1. See Filar, J. et al., Competitive Markov Decision Processes, Springer-Verlag New York, Inc., 1996 (hereafter "Decision Processes").

A strategy S is called reasonable if for every $v \in V$ there exists a number k such that the probability to reach the goal state {g} within at most k steps (e.g., transitions) in the game R(v, S) is positive. Intuitively, a reasonable strategy may not be optimal, but eventually it leads the player to the goal state.

$P'_S$ denotes the minor of the probability matrix $P_S$, where $P'_S$ is obtained by crossing out from $P_S$ the row "i" number 0 and the column "j" number 0. The i=0 row represents the g=0 vertex, and typically there is no reason to exit the goal state. For example, in this case where a strategy is being developed to append test segments to a test sequence in order to obtain an accepting state, there is often no reason to exit an accepting state (e.g., an accepting state often is the goal state). Similarly, the j=0 vertex (i.e., j=g=0) will always be the best strategy when you can move directly to the goal state from any other i vertex.

Since S is reasonable, no subset U of V-{g} is closed under the game R(u, S), for any $u \in U$. A closed subset is a subset of vertices that the game never leaves it after starting at any vertex of it. The only closed subset of V is {g}. This property is used to establish the following facts.

Lemma 1: Let S be a reasonable strategy. Then, $$\lim_{k \to \infty} P'^k_S = 0 \quad (EQ3)$$

and $$\sum_{k=0}^{\infty} P'^k_S = (I - P'_S)^{-1} \quad (EQ4)$$

Proof follows from Proposition M.3 in "Competitive Markov Decision Processes" of J. Filar and K. Vrieze, and is presented here for the sake of completeness. The top row of $P_S$ has 1 as the first element followed by a sequence of zeroes. Therefore for each $k \geq 0$ the power $P'^k_S$ equals the minor of $P^k_S$ obtained by removal of row 0 and column 0. The element i, j of the matrix $P^k_S$ is the probability to get from i to j in exactly k moves. Since the strategy S is reasonable, for every i there exists an integer k such that $P'^k_S[i, 0] > 0$ and therefore the sum of the i-th row of $P'^k_S < 1$. The same is true for $P'^{k+1}_S$. Therefore there exists an integer k and a positive real number $\delta < 1$ such that the sum of every row of $P'^k_S$ is at most $\delta\alpha$. But then $P'^i_S$ has row sums at most $\delta^m$ for any m>0 and $i \geq mk$ which proves the convergence above in EQ3 and also existence of the sum $$\sum_{k=0}^{\infty} P'^i_S.$$

Now proof of EQ4 is shown. For any j>0, there is the following equality $$(I - P'_S)\sum_{i=0}^{j} P'^i_S = \left(\sum_{i=0}^{j} P'^i_S\right)(I - P'_S) = (I - P'^{j+1}_S).$$

Upon taking the limit as j approaches infinity, the following occurs $$(I - P'_S)\sum_{i=0}^{\infty} P'^i_S = \left(\sum_{i=0}^{\infty} P'^i_S\right)(I - P'_S) = I,$$

which proves EQ4.

Reasonable strategies can be characterized in terms of their cost vectors as follows.

Lemma 2: A strategy S is reasonable if and only if $M_S$ is defined.

Proof of the ($\rightarrow$) direction is first shown. Assume S is a reasonable strategy and that $M_S$ exists. By using reasonableness of S, a natural number k can be found such that for any vertex $v \in V$ the probability to finish the game R(v, S) within k steps is positive and greater than some positive real number "a". Let b be the largest cost of any edge. Consider an arbitrary $v \in V -\{0\}$. For every natural number m let $A_m$ denote the event that the game R(v, S) ends within km steps but not within k(m−1) steps, and for every integer $l \geq 0$ let $B_l$ be the event that the game does not end within kl steps. If P is the function of probability of events then, $P(A_m) \leq P(B_{m-1})$ for m>0, and $P(B_l) \leq (1-a)^l$ for $l \geq 0$. Now $M_S[v]$ can be estimated from above as follows;

$$M_S[v] \leq \left( \sum_{m=1}^{\infty} P(A_m)kmb \leq kb \sum_{l=o}^{\infty} P(B_l)(l+1) \leq kb \sum_{l=o}^{\infty} (l+1)(1-a)^l = kb/a^2 \right),$$

which is finite. This proves that $M_S[v]$ is defined for every $v \in V-\{0\}$ and since, of course, $M_S[0]=0$, $M_S$ is defined. This is enough for the proof of (→) in EQ4, but more information is needed about $M_S$.

The vector b is defined over V by $$b[i] = \sum_{j \in V} P_S[i,j]c(i,j) \quad (\forall i \in V), \quad (EQ5)$$

and let b' be the projection of b onto the set $\{1, \ldots, n-1\}$. Let M be another vector over V, defined by $M[0]=0$ and $$M'=(I-P'_S)^{-1}b'_S, \quad (EQ6)$$

where M' is the projection of M onto the set $\{1, \ldots, n-1\}$. M' is defined because of Lemma 1. By transforming equation (EQ6) $M'=b'+P'_S M'$ is obtained, and from this one can conclude, taking into account the fact that $M[0]=0$, that M is really equal to $M_S$.

The (←)direction is now shown by contraposition. Assume that S is not reasonable. Then will be shown that, for some $v \in V, M_S[v]=\infty$. Indeed, let v be such a vertex that for every k>0 the probability to reach the goal vertex in k moves in the game R(v, S) is zero. Let $A \subset V$ be the set of vertices that can be reached in the game R(v, S). Let $\beta = \min_{u,w \in A, (u,w) \in E} c(u,w)$. Then $\beta > 0$ and any run of the game of length l will have cost at least $\beta l$. Now starting from v all runs are infinite, hence have infinite cost. So $M_S[v]$ is undefined which is a contradiction.

A vertex v of a test graph is called transient if the goal state is reachable from v. A test graph is called transient if all its non-goal vertices are transient. There is a close connection between transient graphs and reasonable strategies.

Lemma 3. A test graph is transient if and only if it has a reasonable strategy.

Proof. Let G be a transient test graph. It is shown how to construct a reasonable strategy T. Using transience of G, a shortest path $P_v$ to 0 (shortest in terms of number of edges) is fixed for every $v \in V$. It can also be arranged so that if w is a state that occurs in $P_v$ then $P_w$ is a suffix of $P_v$. For each state v define T(v) as the immediate successor of v in $P_v$. Let us prove that T is a reasonable strategy. Let v be a vertex in V. A number k must be found, such that the probability to reach the goal state within at most k steps in the game R(v, T) is positive. Let $P_v$ be the sequence $(v_1, v_2, \ldots, v_k)$, where k is the length of $P_v$, $v_1 = v$, and $v_k = 0$. If $v_i$ is a state then $v_i + 1 = T(v_i)$ and the probability $p_i$ of going from $v_i$ to $v_{i+1}$ is 1. If $v_i$ is a choice point then the edge $(v_i, v_i + 1)$ in E has probability $p_i > 0$. The probability that R(v, T) follows the sequence $P_v$ is the product of all the $p_i$, so it is positive.

To prove the other direction assume that G has a reasonable strategy S. Then for each $v \in V$ the game R(v, S) eventually moves the marked vertex to the goal vertex thus creating a path from v to g.

Ultimately, the goal is to get a procedure for finding optimal strategies for a given test graph G. Start by formulating the properties of the expected cost vector M as the following optimization problem. Let d be the constant row vector $(1, \ldots, 1)$ of length $|V|=n$.

LP: Maximize dM, i.e. $\Sigma_{i \in v} M(i)$, subject to $M \geq 0$ and $$\begin{cases} M(0) \leq 0 \\ M(i) \leq c(i,j) + M(j) \text{ for } i \in \text{States and } (i,j) \in E \\ M(i) \leq \sum_{(i,j) \in E} \{p(i,j)(c(i,j) + M(j))\} \text{ for } i \in \text{Choices} \end{cases} \quad (LP)$$

The inequalities above are written as a family $\{e_i\}_{i \in I}$ over an index set I, where $I = \{0\} \cup \{(i,j) \in E : i \in \text{States}\} \cup \text{Choices}$.

It is convenient to assume that the indices in I are ordered in some fixed order as $(i_0, i_1, \ldots, i_{k-1})$ such that $i_0 = 0$ and the position of $i \in I$ in this order is referred to by $\bar{\imath}$. The inequalities can be written in normalized form as follows.

$$e_i \equiv \sum_{j=0}^{n-1} A(\bar{\imath}, j)M(j) \leq b(\bar{\imath}),$$

where A is a k×n matrix and b is a column vector of length k. The inequalities (LP) can be written in matrix form as $AM \leq b$ and the dual optimization problem can be formulated as follows.

DP: Minimize Xb, subject to $XA \geq d$ and $X \geq 0$.

DP is used in the proof of Lemma 4. It is helpful in understanding the notions to consider a simple example first.

Figure 5:
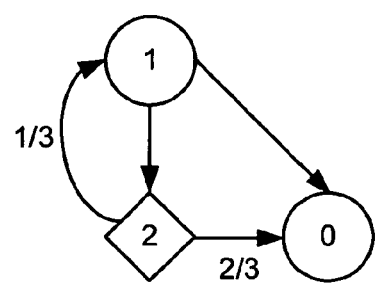
FIG. 5 is a graphic representation of a test graph used to illustrate a linear program.

Example 1. FIG. 5 is a graphic representation of test graph used to illustrate a linear program. Consider the test graph 500 in FIG. 5. The LP associated with 500 has the following inequalities:

$M[0] \leq 0$ $M[1] \leq c(1,2) + M[2]$ $M[1] \leq c(1,0) + M[0]$ $M[2] \leq \frac{1}{3}(c(2,1) + M[1]) + \frac{2}{3}(c(2,0) + M[0])$ The LP in matrix form looks like:

$$\overbrace{\begin{pmatrix} 1 & 0 & 0 \\ 0 & 1 & -1 \\ -1 & 1 & 0 \\ -\frac{2}{3} & -\frac{1}{3} & 1 \end{pmatrix}}^{A} \overbrace{\begin{pmatrix} M[0] \\ M[1] \\ M[2] \end{pmatrix}}^{M} \leq \overbrace{\begin{pmatrix} 0 \\ c(1,2) \\ c(1,0) \\ \frac{2}{3}c(2,0) + \frac{1}{3}c(2,1) \end{pmatrix}}^{b}$$

The dual problem is to minimize Xb, subject to X≧0 and $$(\overline{x_0} \ \overline{x_{(1,2)}} \ \overline{x_{(1,0)}} \ \overline{x_2})A \geq (\overline{1 \ 1 \ 1})$$

It can be written in the form of inequalities:

$$x_0 \geq 1 + x_{(1,0)} + \frac{2}{3}x_2$$

$$x_{(1,2)} + x_{(1,0)} \geq 1 + \frac{1}{3}x_2$$

$$x_2 \geq 1 + x_{(1,2)}$$

Intuitively, $x_e$ can be understood as a flow where the strategy follows an edge with a greater flow.

A solution M of LP is said to be tight for $e_i$ if the left hand side and the right hand side of $e_i$ are equal, i.e., there is no slackness in the solution of $e_i$. The following lemma is considered.

Lemma 4. If LP has an optimal solution M then for all states i there is an edge (i,j) ∈ E such that M is tight for $e_{(i,j)}$, and for all choice points i, M is tight for $e_i$.

Proof. Assume LP has an optimal solution M. By the Duality Theorem in Competitive Markov Decision Processes at Proposition G.8, DP has an optimal solution X. By expanding XA≧d, for each state I, an inequality of the following form is obtained:

$$\sum_{(i,j) \in E} X(\overline{(i,j)}) - \sum_{j \in I} a_{i,j} X(\overline{j}) \geq 1, \quad (EQ7)$$

where all $a_{i,j} \geq 0$, and for each choice point I, an inequality of the form:

$$X(i) - \sum_{j \in I} a_{i,j} X(\overline{j}) \geq 1, \quad (EQ8)$$

where all $a_{i,j} \geq 0$. Let i be a state. From (EQ7) it follows that some $X((\overline{i,j})) > 0$, which by Complementary Slackness as discussed in Competitive Markov Decision Processes at Proposition G.9, implies that M is tight for the corresponding $e_{(i,j)}$. Let i be a choice point. From (EQ8) it follows that $X(\overline{i}) > 0$, which by Complementary Slackness implies that M is tight for the corresponding $e_i$.

The following characterization of transient test graphs is one of the main results of the paper.

Theorem 1. The following statements are equivalent for all test graphs G.
  (a) G is transient.
  (b) G has a reasonable strategy.
  (c) (LP) for G has a unique optimal solution M, $M=M_S$ for some strategy S and the strategy S is optimal.

Proof. The equivalence of (a) and (b) is Lemma 3, and now prove that (b) implies (c). Assume G has a reasonable strategy S. To see that (LP) is feasible, note that M=0 is a feasible solution of (LP). Let M be any feasible solution of (LP). Let M' be the projection of M onto the set {1, ..., n−1}. The inequalities of (LP) ensure that in particular $$M[i] \leq \sum_{j \in \{1, \ldots, n\}} P_S[i, j](c(i, j) + M[j]) \quad (\forall i \in \{1, \ldots, n\}).$$

or in matrix form $M' = b'_S + P'_S M'$ which is equivalent to $(I - P'_S) M' \leq b'_S$ where $b'_S$ and $P'_S$ are defined as above. By Lemma 1 the inverse matrix $(I - P'_S)^{-1}$ exists and all entries are positive. So the inequality will be preserved if it is multiplied by $(I - P'_S)^{-1}$ on the left. The result is $M' \leq (I - P'_S)^{-1} b'_S$. Equation (EQ6) is used to obtain $$M' \leq (I - P'_S)^{-1} b'_S = M'_S. \quad (EQ9)$$

Thus (LP) is feasible and bounded and has therefore an optimal solution M. Lemma 4 ensures that there exists a strategy S such that $$M[i] = c(i, S^*(i)) + M[S^*(i)] \text{ for } i \in \text{States},$$

$$M[i] = \sum_{(i,j) \in E} \{p(i, j)(c(i, j) + M[j])\} \text{ for } i \in \text{Choices},$$

which by definition of expected cost means that $M = M_S^*$. From (EQ9) it follows that $M_S^* \leq M_T$ for any strategy T. Thus S* is optimal.

Figure 6:
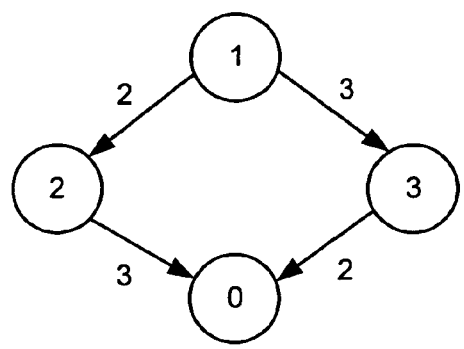
FIG. 6 is a graphic representation of a test graph where all vertices are deterministic.

Finally, note that (b) follows from (c) by using Lemma 2 since $M_S$ is defined. Notice that, even though an optimal strategy S yields a unique cost vector $M_S$, S itself is not necessarily unique. FIG. 6 is a graphic representation of a test graph where all vertices are states. Consider for example the graph in FIG. 6 where all vertices are states and the edges are labeled by costs; clearly both of the two possible strategies are optimal.

Previously, an assumption was made that for each two vertices in the graph there is at most one edge connecting them. It is now shown that no generality was lost by assuming this. For a state u and for any v ∈ V let us choose an edge leading from u to v with the smallest cost and discard all other edges between u and v. In the case of a choice point u the set of multiple edges D between u and v can be replaced with one edge e such that $p(e) = \sum_{e' \in D} p(e')$ and $c(e) = (\sum_{e' \in D} p(e')c(e'))/p(e)$. This merging of multiple edges does not change the expected cost of one step from u. The graph modifications have the following impact on LP. With removal of the edges exiting from states, the corresponding redundant inequalities are dropped. The introduction of one edge for a choice point with changed c and p functions in fact does not change the coefficients before $M_i$ in LP in the inequality corresponding to the choice point and therefore does not change the solution of LP.

When the number of vertices in the graph is big it is practical to search for strategies which are close to optimal in some sense, in cases where the optimal strategy calculation becomes expensive. One such strategy is built in the proof of Lemma 3. Another approach is presented in Optimal Strategies where several methods are described that produce strategies that are optimal, in some sense, for games with a finite number of steps.

Yet another approach is now described for calculating a good strategy.

Let M be a vector with coordinates indexed by V and initially $M^0[i] = 0$ for every state i and $M^0[0] = 0$. Compute $M^{n+1}$ using $M^n$ as follows.

$$M^{n+1}[u] = \begin{cases} \min_{(u,v) \in E} \{c(u,v) + M^n[v]\}, & \text{if } u \in V^a; \\ \sum_{(u,v) \in E} p(u,v)(c(u,v) + M^n[v]), & \text{if } u \in V^P; \\ M^n[u], & \text{if } u = 0. \end{cases} \quad (EQ10)$$

Iterating can be halted when, for example, the maximal growth of M becomes less than some epsilon. After halting iterations, a strategy S is defined such that for all states u in V:

$$c(u, S(u)) + M[S(u)] = \min_{(u,v) \in E} (c(u,v) + M[v]) \quad (EQ11)$$

The iterative process, generally speaking, does not reach a fixed point. Suppose that in FIG. 5 the cost of edge (1, 0) is 3 and that all other edges cost 1, then the sequence of values for M[1] calculated by the algorithm would yield the infinite sequence 0, 2, 2+⅔, 2+⅔+⅔. Notice however, that non-optimal costs can yield an optimal strategy. Furthermore, it may be satisfactory for practical purposes to stop at a strategy which is not optimal but whose expected costs are close to the optimum, or are not improving interestingly between iterations.

The described algorithm is an application of the value iteration for negative Markov Decision problems from "Markov Decision Processes: Discrete Stochastic Dynamic Programming" of M. L. Puterman, Wiley-Interscience, New-York, 1994.

The problem of generating strategies from transient test graphs came up in the context of testing reactive systems with the model-based testing tool SpecExplorer® that has been developed in the Foundations of Software Engineering group at Microsoft Research. A recent overview of SpecExplorer® is given in Grieskamp, W. et al., "Instrumenting scenarios in a model-driven development environment," Information and Software Technology, 46(15):1027-1036, December 2004. This paper explains how the problem arises in this context.

Model-based testing, e.g. as described in Barnett, M. et al., "Towards a tool environment for model-based testing with AsmL®," Petrenko and Ulrich, editors, Formal Approaches to Software Testing, FATES 2003, volume 2931 of LNCS, pages 264-280, Springer, 2003, is a way to test a software system using a specification or model that predicts the (correct) behavior of the system under test. In systems with large state spaces, in particular in software testing, specifying a finite transition system statically is often infeasible. To overcome the limitations of a statically-described finite transition system, one can encode the transition system in terms of guarded update rules called actions of a model program.

In SpecExplorer® the user writes models in AsmL® or in Spec# (see e.g., Gurevich, Y. et al., Semantic Essence of AsmL®, Microsoft Research, Technical Report MSR-TR-2004-27; Barnett, M. et al., The Spec# Programming System: An Overview, Microsoft Research 2004), which is an extension of C# with high-level data structures and contracts in form of pre-conditions, post-conditions, and invariants. The semantics of AsmL® programs is given by Abstract State Machines (ASMs) (see e.g., Evolving Algebra). The ASM semantics of the core of AsmL® can be found in Glässer, U. et al., "Abstract communication model for distributed systems," IEEE Transactions on Software Engineering, 30(7): 458-472, July 2004. A model program P induces a transition system $R_P$ that is typically infinite, because of unbounded data structures and objects. More precisely, a model state is a mapping of variables to values, i.e., a first order structure. The initial model state of $R_P$ is given by the initial values of variables in P. An action is a method of P with 0 or more parameters. A precondition of an action a is a Boolean expression using parameters of a and state variables. An action a is enabled in a state s if its precondition is true in s. There is a transition (s, a, t) from model state s to model state t labeled by action a in $R_P$ if a is enabled in s and invoking a in s yields t. Thus $R_P$ denotes a complete unwinding of P and is typically infinite.

Prior to test case generation, a model program P is algorithmically unwound using a process called "FSM generation" to produce a finite (under) approximation of $R_P$. During FSM generation various restrictions on possible model states are introduced by the user that limit the size of the state space to a feasible range since $R_P$ may be infinite.

For modeling reactive systems with SpecExplorer®, actions are partitioned into observable and controllable ones. Intuitively, a controllable action is an action that a tester has "control" over, whereas an observable action is a spontaneous reaction from the system under test that can only be "observed" by the tester. A model state where only controllable actions are enabled is called stable, it is called unstable otherwise. The FSM generation algorithm creates a timeout transition (s, δ, ŝ) from every unstable model state s to a timeout state ŝ that denotes s after timeout δ, where δ is a time-span that is in SpecExplorer® specified by a state based expression. Intuitively, δ specifies the amount of time to wait to wait in a given model state for any of the observable actions to occur; δ may be 0. For unstable states s, transitions for any of the enabled controllable actions are created only from ŝ. The output of FSM generation is a test graph G, where the choice points of G represent the unstable model states and the states of G represent the stable model states and the timeout states. In the presence of observable actions it is essential that tests always terminate in certain accepting model states only. In G it is assumed, without loss of generality, that there is a final action leading from any state corresponding to an accepting model state to the goal state 0.

This paragraph discusses the elimination of dead vertices. The FSM generation process is guided by various user-defined heuristics to limit the search. One such technique for FSM generation is the usage of state based expressions that partition the state space into a finite number of equivalence classes and limit the number of concrete representatives per equivalence class. A basic version of this technique for non-reactive systems is described in Grieskamp, W. et al., "Generating finite state machines from abstract state machines," In ISSTA '02, volume 27 of Software Engineering Notes, pages 112-122, ACM, 2002. Quite often the FSM generation process may terminate prematurely and not continue the state space exploration from a state because of such restrictions. Consequently the generated test graph is not necessarily transient. If a test graph is not transient then it is pruned to a transient subgraph, prior to the optimal strategy calculation, in order to guarantee that an optimal strategy exists. This step is achieved by "elimination of dead vertices". Two possible definitions of dead vertices are considered. A vertex is strongly dead if no path from it leads to the goal vertex; a vertex is weakly dead if, when IUT is no longer required to move randomly but is allowed to move maliciously, it has a strategy ensuring that the goal vertex is never reached. One can see that every strongly dead vertex is also weakly dead.

Elimination of strongly dead vertices is easily done by checking which vertices are reachable from the goal vertex by backward reachability analysis.

Consider further the notion of weakly dead vertices. Suppose that a path on the graph is considered to be correct for testing only if it ends in the goal vertex. As explained above, the test graph is an under-approximation of $R_P$. Therefore, a choice point which is weakly dead could exist only because FSM generation stopped too early and as a result of this, for any strategy of TT, some path from the choice point leads to a "trap"—a strongly dead state. Two options are available. Remove the edges which make the choice point weakly dead, or remove the choice point itself. Removal of choice edges is in general undesirable, since it may not correspond to the IUT behavior and could violate the conformance relation. In such a case, it is desirable to purge out weakly dead vertices. An efficient algorithm for achieving this is given in Parity Games, at Section 4. A simpler but less efficient algorithm is provided in Probabilistic Systems (i.e., Algorithm 1). Finally, another version, works as follows. First, it finds the set of vertices R from which the goal is reachable. The set of the rest of the vertices Tr=V−R is a trap for TT. Then the set of vertices W, from which IUT has a strategy to reach Tr, is computed. The set W consists of weakly dead vertices, but does not necessarily contain all of them. W is removed from the graph and the process is repeated until no new weakly dead states are found. Each iteration takes O(n) time where n=|V|, so the whole algorithm takes $O(n^2)$ time. The algorithm in Parity Games takes $O(m\sqrt{m})$ time where m is the number of edges.

The proof of above Theorem 1 closely follows the scheme of the proof in Decision Processes at Theorem 2.3.1, which states that an optimal strategy for Markov decision process with discounted rewards is a solution of the corresponding linear program. However there is no direct connection between the theorems; the expected cost of a reachability game can be expressed in terms of discounted rewards in a Markov decision process. At the same time, our problem does not reduce to average reward stochastic games which are also discussed in Decision Processes.

Transient games defined in Decision Processes at 4.2 have similar properties with reachability games on transient test graphs. For example, for a transient game the total expected game value can be calculated and corresponds to existence of expected game cost in our case. A transient stochastic game is a game between two players that will stop with probability 1 no matter which strategies the players choose. However, for some transient test graphs TT can choose such a strategy that the game will never end with a positive probability.

The game view of testing reactive systems was addressed in Optimal Strategies, but the accepting states and optimal strategies discussed herein were left open. For solving verification problems of reactive and open systems, games have been studied extensively in the literature. A game view has been proposed as a general framework for dealing with system refinement and composition. See Game Models. Model programs with controllable and observable actions, viewed as transition systems, correspond to interface automata in Game Models, and the conformance relation used in SpecExplorer® is a variation of alternating refinement (see e.g., Game Models and see Alur, R. et al., Alternating Refinement Relations, Proceedings of the Ninth International Conference on Concurrency Theory (CONCUR '98), volume 1466 of LNCS, pages 163-178, 1998. Intuitively, the IUT must accept all controllable actions enabled in a given state, and conversely, the model must accept all observable actions enabled in a given state. The IUT may however accept additional controllable actions that are not specified in the model; this situation arises naturally in testing of multithreaded or distributed systems, where only some aspect of the IUT, and not all of its behavior, is being tested.

Extension of the FSM-based testing theory to nondeterministic and probabilistic FSMs (Alur, R. et al., Distinguishing Tests for Nondeterministic and Probabilistic Machines, Theory of Computing, pages 363-372, 1995; Gujiwara, S. et al., Testing Nondeterministic State Machines with Fault-coverage, Protocol Test Systems, pages 363-372, 1992; Yi, W. et al., Testing Probabilistic and Nondeterministic Processes, Testing and Verification XII, pages 347-61, North Holland, 1992), in particular for testing protocols, got some attention ten years ago. However with the advent of multithreaded and distributed systems, it recently got more attention. In this regard, a recent paper (Zhang, F. et al., "Optimal transfer trees and distinguishing trees for testing observable nondeterministic finite-state machines," IEEE Transactions on Software Engineering, 29(1):1-14, 2003) is related to our work but it does not use games (compare to Optimal Strategies).

Model-based testing has recently received a lot of attention in the testing community and there are several projects and model-based testing tools that build upon FSM-based testing theory or Labeled Transition Systems based (IOCO) testing theory (Artho, C. et al., Experiments with Test Case Generation and Runtime Analysis, Abstract State Machines 2003, volume 2589 of LNCS, pages 87-107, Springer, 2003; Hartman, A. et al., Model Driven Testing—AGEDIS Architecture Interfaces and Tools, $1^{st}$ European Conference on Model Driven Software Engineering, pages 1-11, Nuremberg, Germany, December 2003; Kuliamin, V. V. et al., UniTesK: Model Based Testing in Industrial Practice, $1^{st}$ European Conference on Model Driven Software Engineering, pages 55-63, Nuremberg, Germany, December 2003; Tretmans, J. et al., TorX: Automated Model Based Testing, $1^{st}$ European Conference on Model Driven Software Engineering, pages 31-43, Nuremberg, Germany, December 2003. In IOCO, test cases are trees and deal naturally with non-determinism (Brinksma, E. et al., "Testing Transition Systems: An Annotated Bibliography," Summer School MOVEP'2 k—Modeling and Verification of Parallel Processes, volume 2067 of LNCS, pages 187-193, Springer, 2001; Tretmans, J. et al., "TorX: Automated model based testing," $1^{st}$ European Conference on Model Driven Software Engineering, pages 31-43, Nuremberg, Germany, December 2003). Typically, goal oriented testing is provided through model-checking support that produces counterexamples that may serve as test sequences. The basic assumption in those cases is that the system under consideration is either deterministic, or that the non-determinism can be resolved by the tester (i.e., the systems are made deterministic from the tester's point of view). Thus, SpecExplorer® is currently alone in supporting goal oriented game strategies for testing.

Solving linear equations for generating test strategies from transient test graphs, may require a specialized algorithm. From experiments with SpecExplorer®, standard techniques, using the simplex method, do not seem to scale for large models. Thus, when the number of states exceeds 500, it may be better to use an approximate solution described above in the context of EQ10 and EQ11.

Exemplary Data Structures

Again, the foregoing and following examples are only illustrative and should not be used to limit the scope of the described technologies. In one scenario, a user describes a model program written in a specification language. A testing tool generates an FSM from the model and generates test suites from the FSM. The obtained test suites are used for testing an implementation the model specifies. States of the FSM correspond to snapshots of the model states, and different FSM states correspond to model states with different model variable values. Transitions of the FSM correspond to different model action invocations. Each transition has a source state and a target state. A Test suite constitutes a set of test segments. Each test segment is a pair (Transitions, Choice) where Transitions is a linked sequence of transitions and Choice is a set of transitions. Choice corresponds to events which are possible in a current state. Alternatively, Choice can represent internal non-determinism of the model where an action invocation can result in different model states or in different return values of the action. Transitions from a Choice have a same starting state. If Transitions is not empty then the last state of Transitions coincides with the start state of Choice. A transition T, belongs to a test suite if T belongs to some test suite segment Transitions or Choice.

A State w is terminal for a test suite if there is a transition from the test suite with w as a target state but no transition from the test suite with w as a source state.

Terminal states are special in a sense that execution of the implementation by following segments from a test suite cannot continue after a terminal state, for one reason or another. A terminal state requires the implementation to be reset. For that reason the terminal state has to allow some methods calls which are usual for resetting; cleanups, resource destructions, file closing and so on. The freedom of a test tool to cut test segments anywhere was one of the reasons to allow users to define states of the FSM that can be terminal.

A user provides a Boolean expression which is evaluated on the model; states for which the value of the expression is true are called accepting states. A default expression is "true", so by default all states can be accepting. Preferably, a tool provides that each terminal state of any generated test suite is accepting.

Exemplary Dead States Elimination

States of an FSM generated by a testing tool can be divided into two subsets; DS and NS. State s belongs to NS if some event or non-deterministic action of the models starts at s. The set DS is the compliment of NS.

In one example, a strategy is an instruction to a testing tool on how to continue traversal from a certain state; formally strategy S is a mapping from DS to FSM transitions, such that S(s) is a transition starting from s. If A is a set of accepting states, and every terminal test segment finishes in A, then dead state elimination ensures that during any FSM traversal, dead ends are avoided. DS is a set of states from which A cannot be reached. Such states are called dead states. Possibly, a state may also be called dead if some behavior of the implementation can bring us to a state from which A is unreachable. Thus, there are two possible definitions of dead states. A State is strongly dead if there is no path from it to an accepting states. A State w is weakly dead if for every strategy S there is a path following S from w to a strongly dead state. Notice that strongly dead states are also weakly dead.

Strongly dead states are obtained by walking backward from accepting states. The backward walk from A discovers the compliment of the strongly dead set. The algorithm for weakly dead states set is more complex but it has been described in the literature as Buchi MDP game problem. It can be found at on the bottom of page 9 and at the top of page 10, in "Simple Stochastic Parity Games" by Krishnendu Chatterjee et al, in *Proceedings of the International Conference for Computer Science Logic* (CSL), Lecture Notes in Computer Science 2803, Springer-Verlag, 2003, pp. 100-113.

The FSM for test suite generation with accepting states is obtained from the original FSM by removal of dead states. The user is able to choose what kind of dead states should be removed.

Exemplary Strategy Leading to Accepting States Calculation

In one example, the initial test suite generation does not change from the case when every state is an accepting one. However if the generated test suite has a terminal state which is not accepting then the test suite has to be extended. For this purpose, a strategy is calculated leading to accepting states, and test sequences are extended by following this strategy. In one example, a strategy leading to accepting states is calculated by methods described in Non-Deterministic Testing, U.S. patent application Ser. No. 10/758,797, filed Jan. 15, 2004, which is incorporated herein by reference. In other examples, a strategy leading to accepting states is provided via expected costs obtained from a linear program (LP). LP can be solved applying the Simplex Method to the linear program which is well known in the arts. In another example, a strategy leading to accepting states is provided via expected costs obtained from a linear approximation (LA), for example, as described above in the context of EQ10 and EQ11. A method used to obtain a strategy will vary based on the number of states and the computers access to the linear processor (i.e., GPU). In one example, LP is used for 500 or fewer states, and LA is used for greater than 500 states.

Exemplary Method of Extending a Test Suite

FIG. 7 is a program listing of an exemplary method for extending a test suite. In the exemplary program listing 700, the symbol T 702 represents a test suite. In this example, it is assumed that transitions adjacent to dead states are excluded from the FSM. Symbol Q 704 represents a queue which initially contains all terminal non-accepting states of the test suite. Symbol S represents a strategy 706 leading to accepting states (e.g., S(v)–>v).

At 708, while the Q of all terminal non-accepting states is not empty, the method continues.

At 704, the method removes a state from the terminal non-terminal accepting state queue, and stores the state in variable w.

At 710, the method creates a new segment.

At 702, the method adds the segment to the test suite.

At 716, while the present state is not an accepting state 712 or a choice point 714, use the strategy to find the a transition from the present state 706, append the transition to the segment 718, and assign the next state to the present state variable 720.

At 712, when the present state is an accepting state, exit the while condition 716, and obtain a new terminal non-accepting state from the queue 704.

At 714, when the present state is a choice point, end the present segment with a choice point 722, and for transition exiting the choice point 724, add the target state of the transition to T if the target state is a non-accepting state, then exit the while condition 716, and obtain a new terminal non-accepting state from the queue 704.

Exemplary Computing Environment

Figure 8:
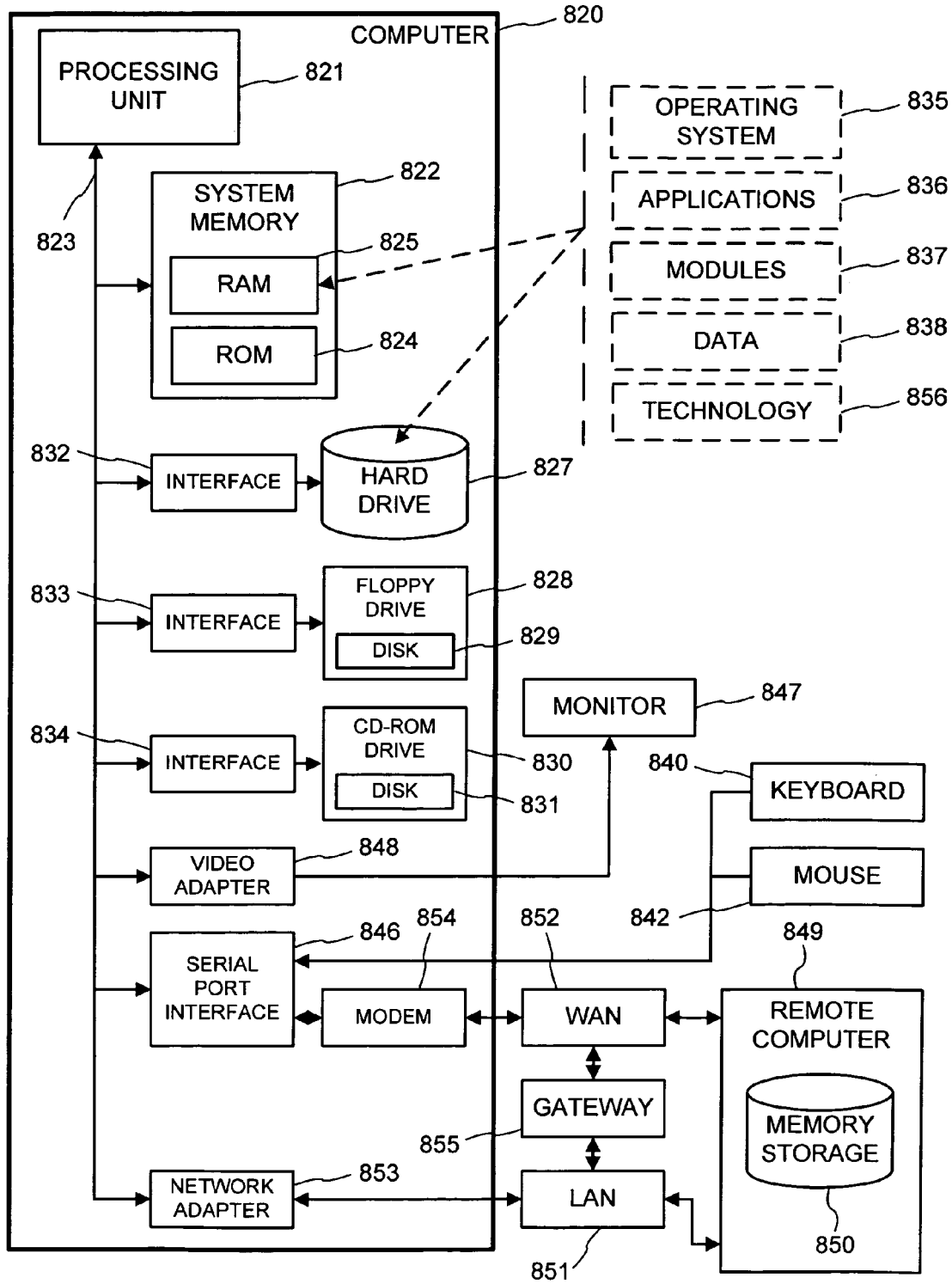
FIG. 8 is a block diagram of a computer system for extending test sequences to accepting states.

FIG. 8 and the following discussion are intended to provide a brief, general description of a suitable computing environment for an implementation of state exploration using multiple state groupings. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 8, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an implementation of the described methods and systems of extending test sequences to accepting states 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computing devices may be used, wireless or otherwise.

ALTERNATIVES

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method comprising:
receiving a state space, a test suite, and an identified accepting state;
traversing the state space and assigning expected costs to states comprising the costs expected to reach the identified accepting state;

using the assigned expected costs, creating a strategy comprising an indication of a transition to take from a present state;

determining test sequences in the test suite that terminate in states other than the identified accepting state; and appending the determined test sequences with test segments obtained using the created strategy.

2. The method of claim 1 wherein the states other than the identified accepting state further comprise choice points.

3. The method of claim 1 wherein the expected costs are obtained via a linear program wherein an expected cost vector is maximized subject to conditions of a set of linear inequalities minimizing the expected costs of individual states.

4. The method of claim 1, wherein the expected costs are determined by first setting deterministic states equal to zero expected costs, and then iteratively repeating the following at least three times, (1) assigning expected costs to non-deterministic states such that, for a non-deterministic state, an expected cost for that state comprising the sum of expected costs to reach accepting states via transitions to adjacent states, where the cost of each transition is determined by the cost to reach an identified accepting state via an adjacent transition multiplied by the probability that a non-deterministic transition to an adjacent state will be selected, and (2) assigning expected costs to deterministic states comprising assigning a lowest cost of reaching an identified accepting state via an adjacent transition.

5. The method of claim 1, wherein the identified accepting state is received as an expression based on state space variable-value assignments.

6. The method of claim 1, wherein the identified accepting state is received as a boolean expression.

7. The method of claim 6, wherein plural states determined to be true for the Boolean expression are the identified accepting states.

8. The method of claim 1, wherein the identified accepting state is received as a click on an input device in conjunction with a cursor on a graphical user interface, wherein, the click is received when the cursor is over a test graph state.

9. The method of claim 1 wherein the state space comprises a test graph and dead states are removed from the test graph before creating expected costs.

10. The method of claim 1 wherein the state space is a test graph comprising non-deterministic states, deterministic states, and a goal state comprising an identified accepting state.

11. A computerized system comprising:
computer memory and a central processing unit; and
the computer memory comprising,
an implementation under test;
a test graph comprising a representation of a subset of states of the implementation under test and a test suite providing coverage for the test graph; and
a test tool accessing modules to, receive an indication of an accepting state, generate a strategy to reach the accepting state in a lowest cost, determine test sequences in the test suite that terminate in states other than the accepting state, and append transitions to the determined test sequences using the generated strategy.

12. The system of claim 11 wherein at least one appended test sequence ends in a choice point.

13. The system of claim 11 wherein at least one appended test sequence ends in an accepting state.

14. The system of claim 11 wherein expected costs are assigned using a simplex method on a linear program comprising maximizing a cost vector under conditions of minimizing a set of inequalities of expected costs of reaching individual states.

15. The system of claim 11 wherein an output test suite comprises plural appended test segments comprising at least two test segments that terminate in different accepting states.

16. A computer-readable medium having thereon computer-executable instructions, which when executed by a computer, cause the computer to perform a method, the method comprising:
receiving a test graph, a test suite, and an identified accepting state;
traversing the test graph and assigning expected costs to states comprising the costs expected to reach the identified accepting state from a state;
using the assigned expected costs, creating a strategy comprising an indication of a transition to take from a present state;
determining test sequences in the test suite that terminate in states other than the identified accepting state; and
appending determined test sequences with test segments created via transitions indicated in the created strategy.

17. The computer readable medium of claim 16 wherein the expected costs are obtained via a linear program wherein an expected cost vector is maximized subject to conditions of a set of linear inequalities minimizing the expected costs of reaching the identified accepting state via individual states.

18. The computer readable medium of claim 16 wherein the expected costs are determined by an iterative approximation.

19. The computer readable medium of claim 16 wherein the test graph comprises non-deterministic states, deterministic states, and a goal state comprising the identified accepting state.

20. The computer readable medium of claim 16 wherein the identified accepting state is received as a Boolean expression comprises one of plural states determined to be true for the Boolean expression.

* * * * *